SAGE & BAKER.
Combined Portable Sheep Rack, Shed and Fold.
No. 45,080. Patented Nov. 15, 1864.
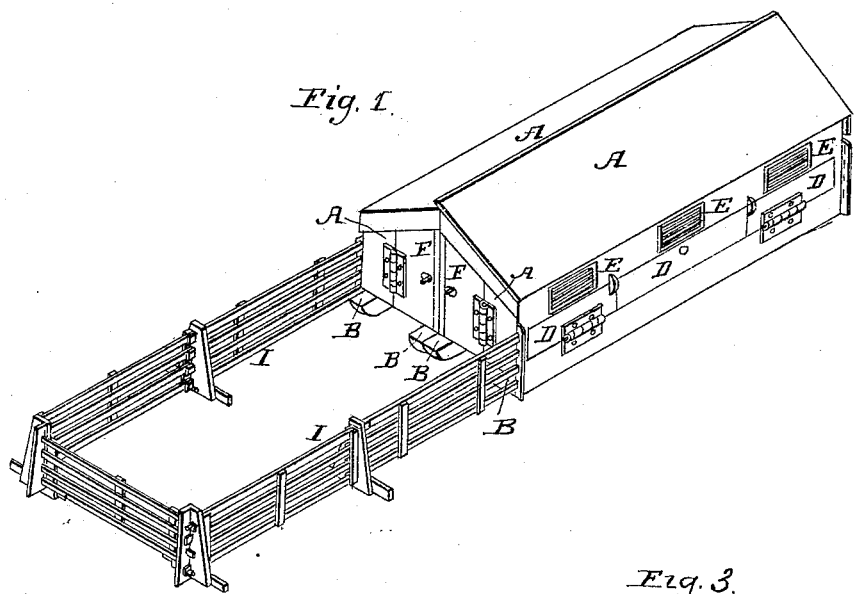
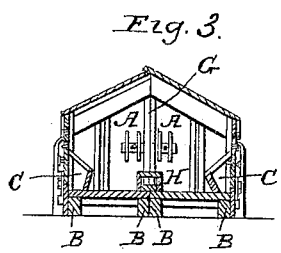
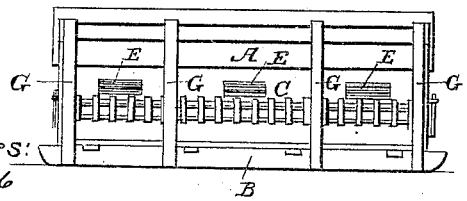

United States Patent Office.

S. L. SAGE AND O. T. BAKER, OF HUNTINGTON, OHIO.

COMBINED PORTABLE SHEEP RACK, SHED, AND FOLD.

Specification forming part of Letters Patent No. 45,080, dated November 15, 1864.

*To all whom it may concern:*

Be it known that we, S. L. SAGE and O. T. BAKER, of Huntington, in the county of Lorain and State of Ohio, have invented new and useful Improvements in Combined Portable Sheep Rack, Shed, and Fold; and we do hereby declare that the following is a full and complete description of the construction and operation of the same, reference being had to the accompanying drawings, making part of this specification, in which—

Figure 1 is a perspective view. Fig 2 is a longitudinal vertical section, and Fig. 3 is a transverse vertical section.

Like letters refer to like parts.

The nature of our invention consists, first, in the construction of the sheep-rack by means of which the sheep can be fed without being exposed to the weather or encroaching upon each other; and, second, in the arrangement of the shed and fold for the protection and comfort of the sheep.

A represents the shed which contains the sheep-rack and feeding-troughs. This is made in two sections, as shown in the figures, each section being placed upon runners B for the convenience of transportation from place to place, and when placed side by side appear as in Fig. 1. Along the outer side of each section is placed the racks C. (Shown in Figs. 2 and 3.) These consist of a trough, which is upon the inside provided with slats, through which the sheep procure their food. Upon the outside are placed longitudinal hinged doors D, which open outward and downward, and through which the feed is introduced into the feed-racks. Above these doors are ventilating-windows E, which are covered by slats or blinds to admit light and air and prevent the intrusion of dogs. The ends of the sections are provided with doors F, which may be thrown open to admit the sheep to the racks and feed-troughs and closed to protect them during the night. Along the center, between the posts, is placed a series of feed-troughs for supplying grain, meal, salt, &c., to the animals. These are ordinarily kept covered with a hinged lid and only opened when needed for use. The sheep can pass over them from one section to the other.

The fold is formed by joining to either or both ends of the parts already described sections of a portable fence, I. This may be of any convenient form of structure that can readily be taken down and transported and again set up. By opening the doors the sheep are permitted to go out upon the ground in pleasant weather to take the fresh air and at the same time prevented from straying away from the fold.

The whole structure is light, and can be moved from place to place at pleasure. By its use sheep are thoroughly protected from the inclemencies of the weather, and from depredations of dogs during the night-time.

If desired, the two sections can be placed end to end, making an open shed, facing in any desired direction, and the front can be inclosed by a fence, I, in the same manner as is now shown in regard to the end.

What we claim as our improvement, and desire to secure by Letters Patent, is—

1. The sections A A, when constructed and arranged as described, and provided with feed-racks, in the manner and for the purpose specified.

2. The combination of the fence I, with the sections A A, whether said sections are united as shown, or placed end to end, as described.

S. L. SAGE.
O. T. BAKER.

Witnesses:
J. LEONARD,
J. HOLMES.